US008463793B2

United States Patent
Fukuta et al.

(10) Patent No.: US 8,463,793 B2
(45) Date of Patent: Jun. 11, 2013

(54) METHOD EXECUTED BY MANAGEMENT SERVER, SYSTEM, AND COMPUTER-READABLE RECORDING MEDIUM

(75) Inventors: Shigeki Fukuta, Kawasaki (JP); Hiroshi Yamamoto, Nagaoka (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 12/880,257

(22) Filed: Sep. 13, 2010

(65) Prior Publication Data

US 2011/0219007 A1    Sep. 8, 2011

(30) Foreign Application Priority Data

Sep. 14, 2009    (JP) .................................. 2009-211634

(51) Int. Cl.
*G06F 17/30* (2006.01)
(52) U.S. Cl.
CPC ................................. *G06F 17/30017* (2013.01)
USPC ........................................................ 707/741
(58) Field of Classification Search
USPC .................. 707/698, 711, 727, 730, 741, 747
See application file for complete search history.

(56) References Cited

U.S. PATENT DOCUMENTS

| 7,225,221 B2 * | 5/2007 | Ohashi ........................... 709/203 |
| 7,558,802 B2 | 7/2009 | Yako et al. |
| 7,925,655 B1 * | 4/2011 | Power et al. ................... 707/741 |
| 2002/0040289 A1 * | 4/2002 | Ohashi ............................ 703/22 |
| 2008/0114787 A1 | 5/2008 | Kashiyama et al. |

FOREIGN PATENT DOCUMENTS

| JP | 2006-185019 A | 7/2006 |
| JP | 2007-122302 A | 5/2007 |
| JP | 2008-123426 A | 5/2008 |

OTHER PUBLICATIONS

Xiantao Chen et al., Study on Performance Testing of Index Server Developed as ISAPI Extension, Nov. 12, 2009, IEEE, 1391-1395.*
Beomseok Nam et al., Spatial indexing of distributed multidimensional datasets, 2005, IEEE, 743-750.*

* cited by examiner

*Primary Examiner* — Jean B Fleurantin
(74) *Attorney, Agent, or Firm* — Fujitsu Patent Center

(57) ABSTRACT

A method executed by a management server controlling a plurality of index servers for searching a database storing an object identifier and an attribute value, each of the plurality of index servers handling a part of the database, storing index information including the attribute value within a range predefined for the each of the plurality of index servers and the associated object identifier stored in the database, the method has deleting one of index information stored in one of the index servers in reference to the range of each of the index servers when an updated attribute value coming to be out of the range of the one of the index servers, obtaining a frequency of the deleting and the storing the one of the index information, and enabling the index server to obtain an attribute value from the database when the obtained frequency being more than a predetermined value.

15 Claims, 9 Drawing Sheets

METHOD EXECUTED BY MANAGEMENT SERVER, SYSTEM, AND COMPUTER-READABLE RECORDING MEDIUM

CROSS-REFERENCE TO RELATED APPLICATION

This application is based upon and claims the benefit of priority of the prior Japanese Patent Application No. 2009-211634, filed on Sep. 14, 2009, the entire contents of which are incorporated herein by reference.

FIELD

The present art relates to a method for controlling a database system, an index server, and a computer-readable recording medium.

BACKGROUND

A large-scale database system includes a plurality of databases and a plurality of index servers, in which the databases and index servers are managed in a distributed manner. The databases hold identification information and attribute information of objects to be managed registered therein. The index servers manage index information in which attribute information and identification information are associated with each other by using the attribute information as key information.

When receiving a search request from a search device, an index server obtains identification information corresponding to attribute information serving as key information included in the search request with reference to index information, and transmits the obtained identification information to the search device. The index information needs to be updated by reflecting an update of attribute information. Also, in accordance with the change in the attribute information, index information needs to be newly registered in the index server that manages the changed attribute information.

When attribute information is frequently updated, the index information corresponding thereto imposes a large update load on the database system. When multiple index servers are used for distributed management in order to distribute loads of search and index management, movement of index information between index servers may be necessary, which further increases the update load. Therefore, the amount of communication performed for a process of registering/deleting index information between an index server and a registration server increases.

The related arts include the followings: Japanese Laid-open Patent Publication Nos. 2006-185019, 2007-122302, and 2008-123426.

SUMMARY

According to an aspect of an embodiment, a method executed by a management server controlling a plurality of index servers for searching a database storing an object identifier and an attribute value associated with the object identifier, each of the plurality of index servers handling a part of the database, each of the index servers storing index information including the attribute value within a range predefined for the each of the plurality of index servers and the associated object identifier stored in the database, each of the index servers returning the object identifier in reference to the stored index information in response to a search request transmitted from a search apparatus, the method has deleting one of index information stored in one of the index servers and storing the one of the index information into other index server in reference to the range of each of the index servers when the attribute value stored in the database being updated, and the updated attribute value coming to be out of the range of the one of the index servers and to be in the range of the other index server, obtaining a frequency of the deleting and the storing the one of the index information, and enabling the index server to obtain an attribute value from the database upon the index server receiving a search request corresponding to the one of the index information from the search apparatus when the obtained frequency being more than a predetermined value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
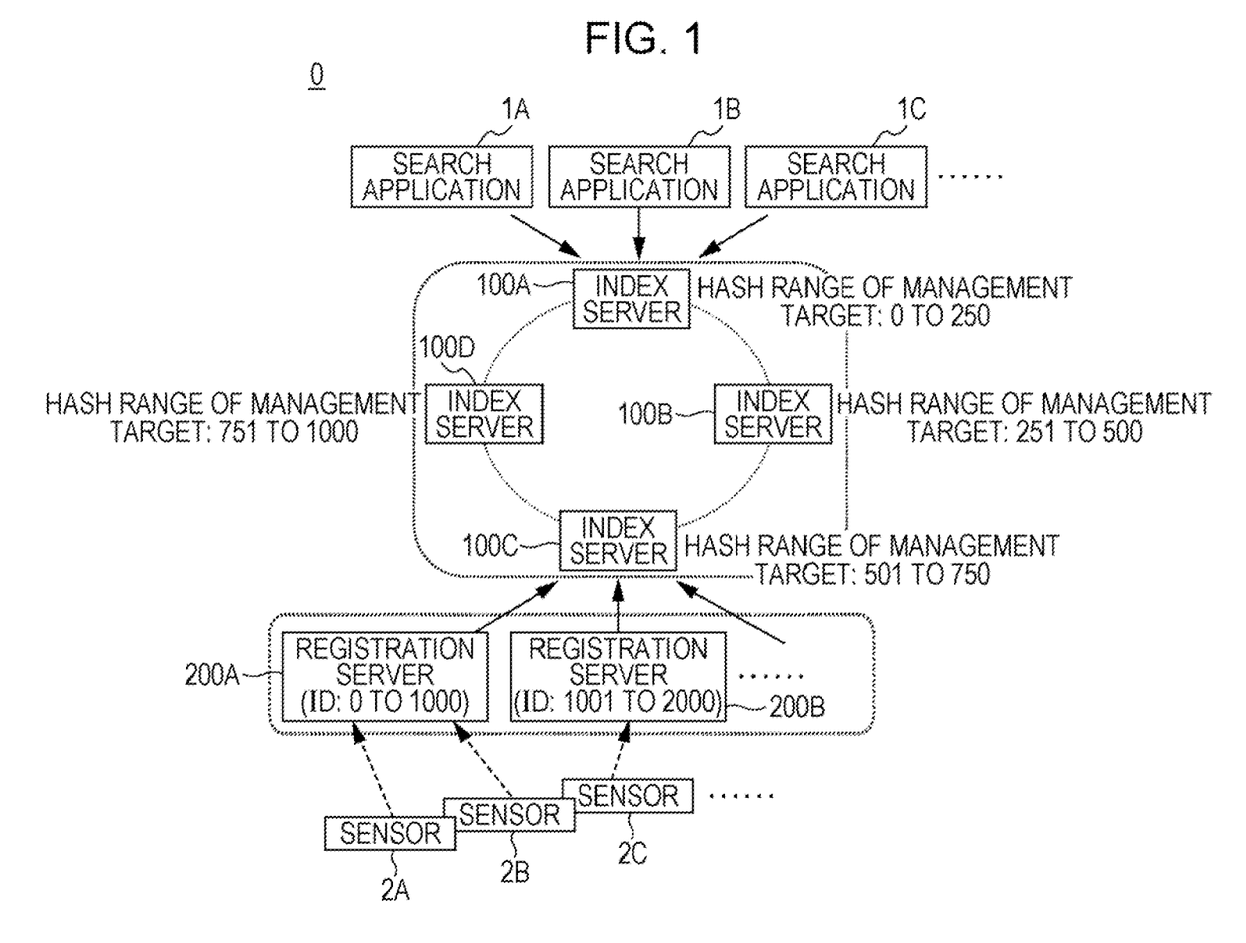
FIG. 1 is a diagram illustrating an entire configuration of a database system.

An entire configuration of a database system will be described with reference to FIG. 1. A database system 0 includes a plurality of registration servers and a plurality of index servers. In this embodiment, the database system 0 includes four index servers 100A, 100B, 100C, and 100D, two registration servers 200A and 200B, search applications 1A, 1B, and 1C executed by a search device that searches the index servers 100A, 100B, 100C, and 100D using information input by a user, and sensors 2A, 2B, and 2C. The sensors 2A, 2B, and 2C are temperature sensors, for example, which are provided to objects to be measured. Here, each of the registration servers 200A and 200B serves as a first device and each of the index servers 100A, 100B, 100C, and 100D serves as a second device.

The index servers 100A, 100B, 100C, and 100D (hereinafter referred to as index servers 100 when it is not necessary to distinguish them from each other) manage index information describing attribute information and identification information that corresponds to the attributed information. Here, the attribute information according to this embodiment is information that may serve as a search condition, such as temperature information obtained by the sensors 2A, 2B, and 2C. Each of the index servers 100 receives a search request from the search application 1A, 1B, or 1C.

The sensors 2A, 2B, and 2C are connected to the registration server 200A or 200B directly or via a network (not illustrated), such as a local area network (LAN), a wide area network (WAN), or a personal area network (PAN). In this embodiment, the sensors 2A and 2B are connected to the registration server 200A, and the sensor 2C is connected to the registration server 200B. The registration servers 200A and 200B receive temperature information, which is attribute information, from the sensors 2A, 2B, and 2C. The registration servers 200A and 200B register the received temperature information in a database thereof. Also, the registration servers 200A and 200B (hereinafter referred to as registration servers 200 when it is not necessary to distinguish them from each other) register index information in the index server 100 that manages the received temperature information. Note that the number of the index servers 100 and the number of the registration servers 200 are not limited to the foregoing numbers.

The database system 0 according to this embodiment performs autonomous distributed management of indexes for use in search by using a distributed hash table (DHT). In the DHT, the index servers 100 that manage respective indexes to be managed are determined by using a predetermined hash function, so that a search process and an index management process can be distributed. Each of the index servers 100 that manage indexes for use in search autonomously recognizes a management range of hash values. Each of the index servers 100 manages indexes for use in search of the attribute information included in the range managed by the index server 100. When receiving a data search request from the search application 1A, 1B, or 1C, the index server 100 refers to the management range of hash values recognized by itself and transfers a search message to another index server 100. Then, the index server 100 obtains an ID that matches a search condition from the indexes. In this embodiment, a description will be given about a case where a user searches for a room having a predetermined temperature from among rooms in a building by using temperature sensors provided in the rooms.

Figure 2:
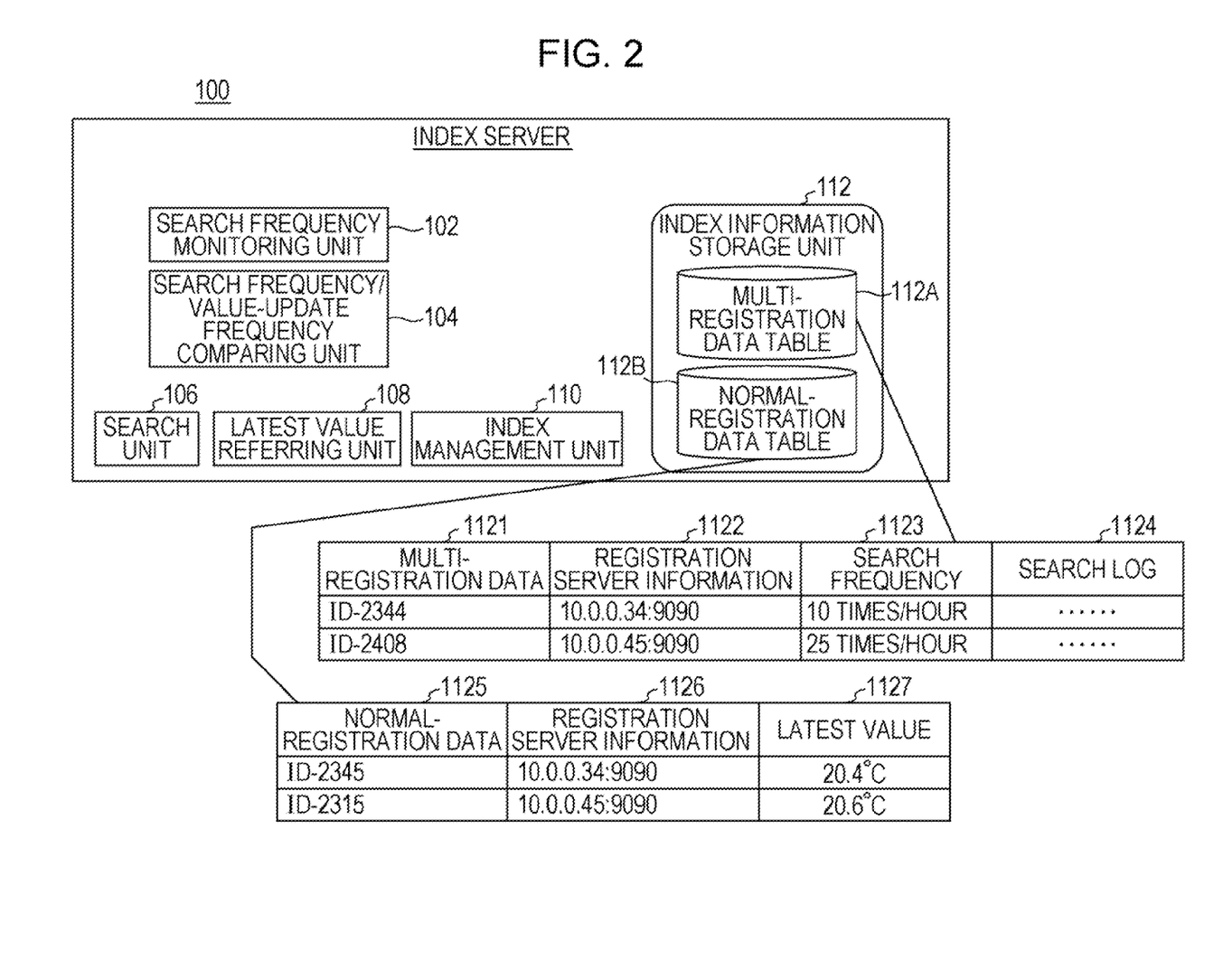
FIG. 2 is a diagram illustrating a configuration of an index server.

Each of the index servers 100 will be described with reference to FIG. 2. The index server 100 has a function of managing index information registered by the registration server 200. The index server 100 includes a search frequency monitoring unit 102, a search frequency/value-update frequency comparing unit 104, a search unit 106, a latest value referring unit 108, an index management unit 110, and an index information storage unit 112.

The index management unit 110 registers data in/deletes data from the index information storage unit 112. The index information storage unit 112 manages two types of index information: a multi-registration data table 112A and a normal-registration data table 112B. The multi-registration data table 112A has IDs of data items for which the index server 100 that manages index information frequently changes because temperature information serving as attribute information frequently changes, and also has information about the IDs. The normal-registration data table 112B has IDs of data items for which the index server 100 that manages index information does not frequently change, and also has information about the IDs.

The multi-registration data table 112A has multi-registration data 1121, registration server information 1122, search frequency 1123, and search log 1124. The IDs of data items that are to be multi-registered are recorded in the multi-registration data 1121. The addresses (IP addresses, port numbers, etc.) of registration servers that manage values corresponding to the IDs of the data items that are to be multi-registered are recorded in the registration server information 1122. The number of times each multi-registration data item is searched for in a certain time period is recorded in the search frequency 1123. In this embodiment, the number of searches per hour is recorded, for example. Information about the time when each multi-registration data item is searched for is recorded in the search log 1124.

On the other hand, the normal-registration data table 112B has normal-registration data 1125, registration server information 1126, and latest value 1127. The IDs of data items that are to be normally registered are recorded in the normal-registration data 1125. The addresses of registration servers that manage values corresponding to the IDs of the data items that are to be normally registered are recorded in the registration server information 1126. The latest values corresponding to the IDs recorded in the normal-registration data 1125 are recorded in the latest value 1127.

The multi-registration data 1121 is data that frequently moves between the index servers 100 when the latest value fluctuates. In this embodiment, the latest value of the multi-registration data is not managed by the index server 100, and thus the index server 100 obtains the latest value corresponding to the ID of the multi-registration data 1121 from the registration server 200 when receiving a search request, thereby determining whether the multi-registration data 1121 is a target of search or not.

The search unit 106 searches the index information storage unit 112 in response to a search request transmitted from the search application 1A, 1B, or 1C. The search frequency monitoring unit 102 obtains the search frequency of the multi-registration data 1121. The search frequency/value-update frequency comparing unit 104 compares a search frequency with a value-update frequency of a specific index and determines whether the frequencies have a predetermined ratio or more. The latest value referring unit 108 obtains the latest value corresponding to the ID that is multi-registered from the registration server 200.

Figure 3:
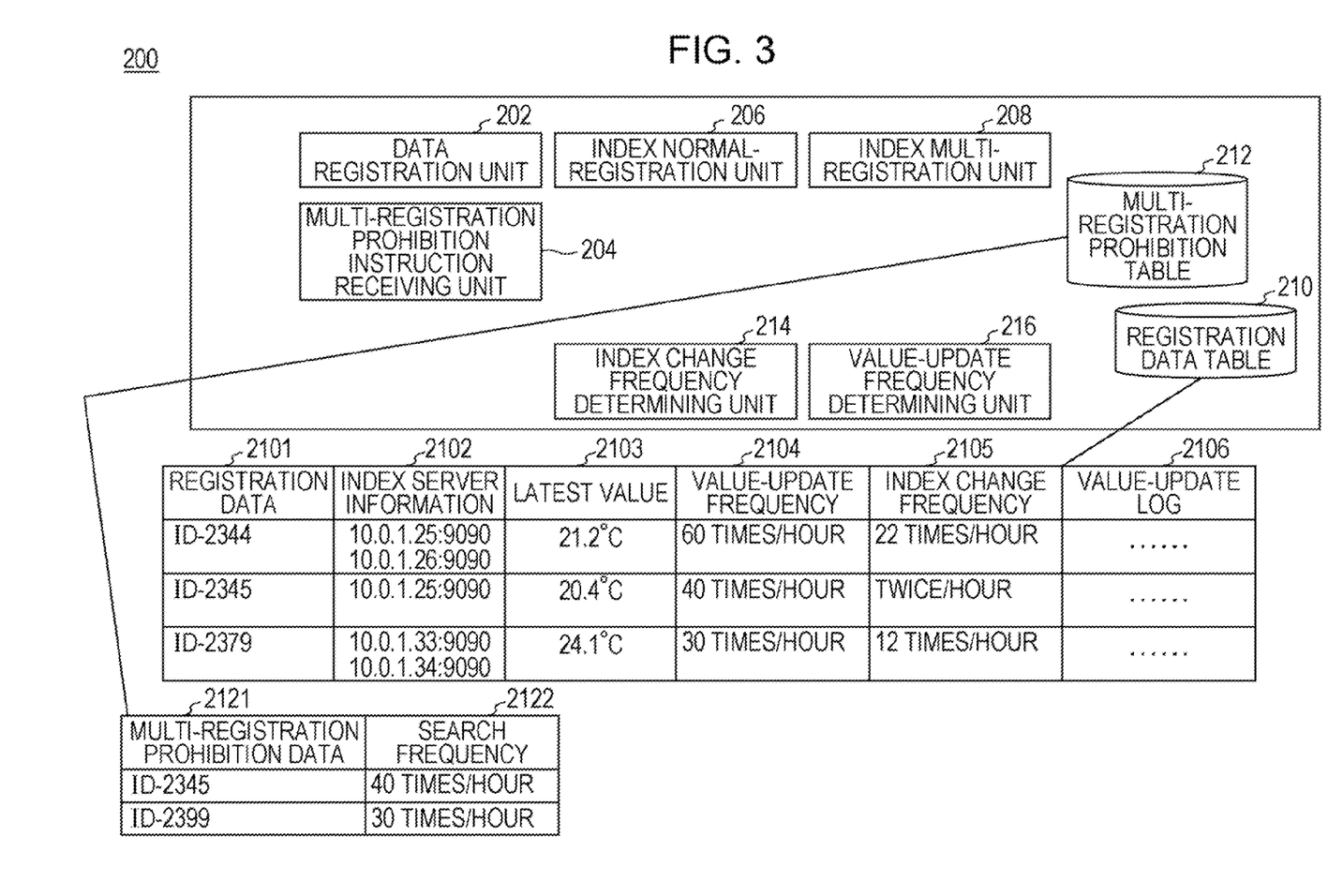
FIG. 3 is a diagram illustrating a configuration of a registration server.

The registration server 200 will be described with reference to FIG. 3. The registration server 200 has a function of registering data received from the sensor 2A, 2B, or 2C, a function of normally registering index information of each data item, and a function of multi-registering index information of each data item. The registration server 200 includes a data registration unit 202, a multi-registration prohibition instruction receiving unit 204, an index normal-registration unit 206, an index multi-registration unit 208, a registration data table 210, a multi-registration prohibition table 212, an index change frequency determining unit 214, and a value-update frequency determining unit 216.

The data registration unit 202 registers data received from the sensor 2A, 2B, or 2C. The index normal-registration unit 206 registers data in the normal-registration data table 112B in the index server 100. The index multi-registration unit 208 registers data in the multi-registration data tables 112A in a plurality of index servers 100.

The multi-registration prohibition table 212 has multi-registration prohibition data 2121 and search frequency 2122. The IDs of data items that are prohibited to be multi-registered are recorded in the multi-registration prohibition data 2121. The number of times each multi-registration prohibition data item is searched for in a certain time period is recorded in the search frequency 2122.

On the other hand, the registration data table 210 has registration data 2101, index server information 2102, latest value 2103, value-update frequency 2104, index change frequency 2105, and value-update log 2106. The IDs of data items that are to be multi-registered are recorded in the registration data 2101. The addresses of the index servers 100 in which the data items are to be registered are recorded in the index server information 2102. When multi-registration is to be performed, the addresses of all the index servers 100 in which data is to be registered are recorded. The latest values corresponding to the IDs recorded in the registration data 2101 are recorded in the latest value 2103. The update frequencies in a certain time period of the values corresponding to the IDs recorded in the registration data 2101 are recorded in the value-update frequency 2104. The numbers of times the values corresponding to the IDs recorded in the registration data 2101 move between the index servers 100 in a certain time period are recorded in the index change frequency 2105. The information about the times when the latest values are updated is recorded in the value-update log 2106.

The index change frequency determining unit 214 calculates the movement frequencies of the respective data items between the index servers 100, and records the values obtained through the calculation in the index change frequency 2105 in the registration data table 210. The movement frequency is the frequency at which the index server 100 that manages index information changes owing to fluctuation of attribute information. The value-update frequency determining unit 216 calculates the value-update frequencies of the respective data items and records the values obtained through the calculation in the value-update frequency 2104 in the registration data table 210.

The multi-registration prohibition instruction receiving unit 204 receives a multi-registration prohibition instruction from the index server 100.

Alternatively, additional information about the sensors 2A to 2C, e.g., the places of the sensors 2A to 2C, may be recorded by adding a new item to the registration data table 210.

Figure 4:
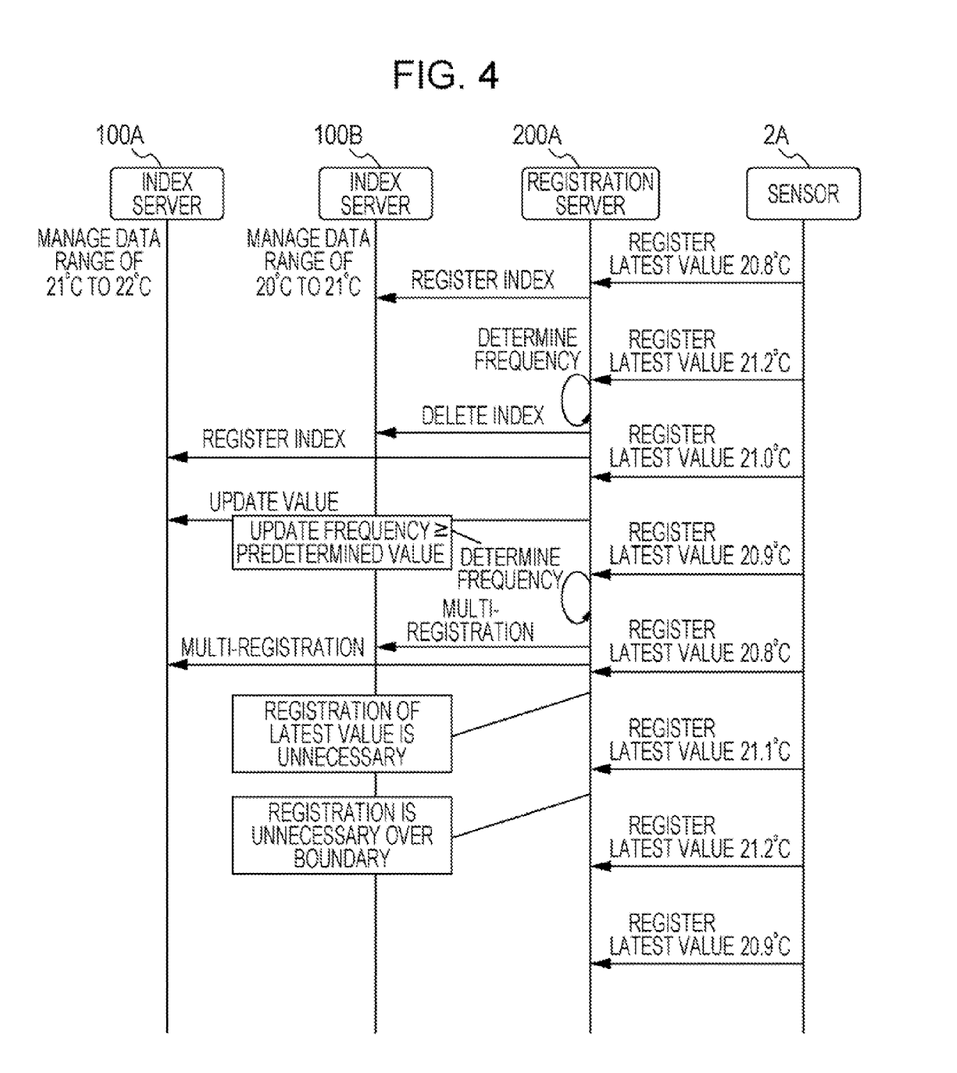
FIG. 4 is a diagram illustrating registration of index information according to an embodiment.

Now, registration of index information according to this embodiment will be described with reference to FIG. 4. When obtaining a latest value of 20.8° C., the sensor 2A transmits the latest value to the registration server 200A. When receiving the latest value from the sensor 2A, the registration server 200A registers 20.8° C. in the registration data table 210. The registration server 200A registers index information in the index server 100B that manages the data range of 20° C. to 21° C.

When obtaining a latest value of 21.2° C., the sensor 2A transmits the latest value to the registration server 200A. When receiving the latest value from the sensor 2A, the registration server 200A registers 21.2° C. in the registration data table 210. The registration server 200A determines the movement frequency of index information from the index server 100B to the index server 100A before registering index information in the index server 100A that manages the data range of 21° C. to 22° C. If the movement frequency is equal to or lower than a predetermined value, the registration server 200A deletes the index information in the index server 100B and registers index information in the index server 100A.

When obtaining a latest value of 21.0° C., the sensor 2A transmits the latest value to the registration server 200A. When receiving the latest value from the sensor 2A, the registration server 200A registers 21.0° C. in the registration data table 210. The registration server 200A updates the value of the index information registered in the index server 100A that manages the data range of 21° C. to 22° C.

When obtaining a latest value of 20.9° C., the sensor 2A transmits the latest value to the registration server 200A. When receiving the latest value from the sensor 2A, the registration server 200A registers 20.9° C. in the registration data table 210. Since 20.9° C. is in the data range managed by the index server 100B, the registration server 200A determines the movement frequency of the index information from the index server 100A to the index server 100B. If the movement frequency is equal to or higher than a predetermined value, the registration server 200A performs multi-registration with respect to the index server 100A and the index server 100B.

After that, even if the registration server 200A receives a latest value of 20.8° C. from the sensor 2A, for example, the registration server 200A determines that the movement frequency of the index information is equal to or higher than the predetermined value, and does not register the latest value of the index information in the index server 100A and the index server 100B. Also, even if the registration server 200A receives a latest value of 21.1° C. from the sensor 2A, for example, the registration server 200A does not register index information in/delete index information from the index server 100A and the index server 100B.

Figure 5:
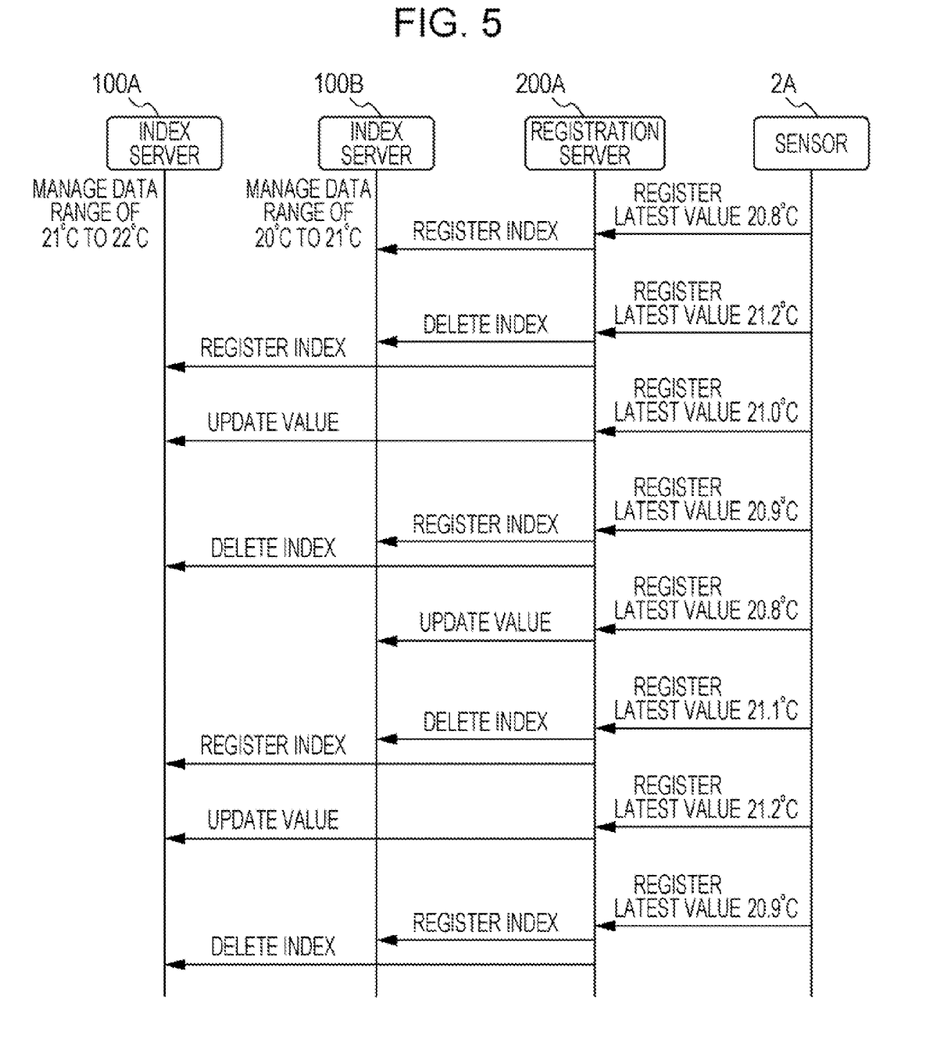
FIG. 5 is a diagram illustrating an example of registration of index information.

As described above, according to this embodiment, it is not necessary to register/delete index information every time the index server 100 changes unlike in the process of registering index information illustrated in FIG. 5, so that the amount of communication performed for registering/deleting index information can be reduced.

Figure 6:
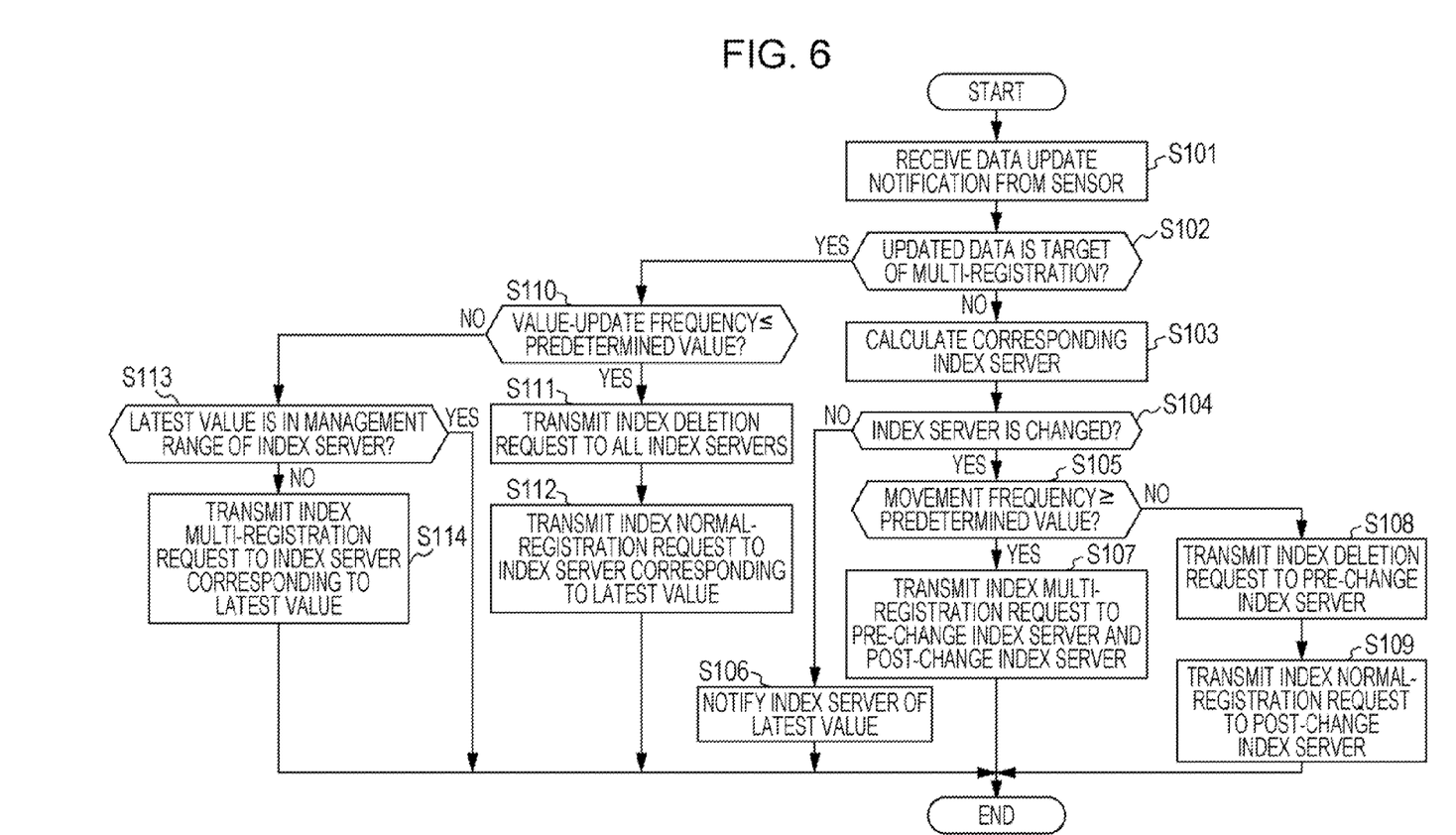
FIG. 6 is a flowchart illustrating a data registration process performed by a registration server.

A data registration process performed by the registration server 200 will be described with reference to FIG. 6. In step S101, the data registration unit 202 receives a data update notification from the sensor 2A, 2B, or 2C. The data registration unit 202 records updated data in the registration data table 210 in accordance with the data update notification received from the sensor. Then, the process proceeds to step S102.

In step S102, the data registration unit 202 determines whether the updated data is a target of multi-registration or not with reference to the registration data table 210. If the updated data is a target of multi-registration, the process proceeds to step S110. On the other hand, if the updated data is not a target of multi-registration, the process proceeds to step S103.

In step S103, the index normal-registration unit 206 calculates and determines the index server 100 corresponding to the received updated data. In the process of calculating the index server 100, a hash value of the updated data is calculated by using a predetermined hash function, thereby calculating the index server 100 that manages the hash value. Then, the process proceeds to step S104.

In step S104, the index normal-registration unit 206 determines whether the index server 100 is changed with reference to the attribute information of the updated data. If the index server 100 is changed, the process proceeds to step S105. On the other hand, if the index server 100 is not changed, the process proceeds to step S106.

In step S106, the index normal-registration unit 206 notifies the index server 100 in which the index information is currently registered of the latest value of the attribute information of the index information. Then, the process ends.

In step S105, the index change frequency determining unit 214 determines whether the movement frequency of the index information between the index servers 100 is equal to or higher than a predetermined value or not. If the movement frequency of the index information between the index servers 100 is equal to or higher than the predetermined value, the process proceeds to step S107. On the other hand, if the movement frequency of the index information between the index servers 100 is not equal to or higher than the predetermined value, the process proceeds to step S108. The predetermined value may be determined by operating the database system 0 in a test and calculating a load imposed on the database system 0, that is, the load of a process of registering/deleting index information with the movement of the index information between the index servers 100.

In step S107, the index multi-registration unit 208 transmits a request for multi-registering the index information to the pre-change index server 100 and the post-change index server 100. Accordingly, when the movement frequency of the index information between the index servers 100 is equal to or higher than the predetermined value, the registration server 200 stops the process of updating the index information. Thus, the load of the update process can be reduced. Then, the process ends.

In step S108, the index normal-registration unit 206 transmits a request for deleting the index information to the pre-change index server 100. Then, the process proceeds to step S109.

In step S109, the index normal-registration unit 206 transmits a request for normally registering the index information to the post-change index server 100. Then, the process ends.

Returning to step S110, the value-update frequency determining unit 216 determines whether the update frequency of the attribute information of the index information is equal to or lower than a predetermined value with reference to the registration data table 210. If the update frequency of the attribute information of the index information is equal to or lower than the predetermined value, the process proceeds to step S111. On the other hand, if the update frequency of the attribute information of the index information is not equal to or lower than the predetermined value, the process proceeds to step S113.

In step S111, the index normal-registration unit 206 transmits a request for deleting the index information to all the index servers 100 in which the index information is currently registered. Then, the process proceeds to step S112.

In step S112, the index normal-registration unit 206 transmits a request for normally registering the index information to the index server 100 corresponding to the latest value. Then, the process ends.

In step S113, the index normal-registration unit 206 determines whether the latest value is in the management range of the index server 100 in which the index information is currently registered. If the latest value is in the management range of the index server 100, the process ends because update of the index information is stopped as described above regarding step S107. On the other hand, if the latest value is not in the management range of the index server 100, the process proceeds to step S114.

In step S114, the index multi-registration unit 208 transmits a request for multi-registering the index information to the index server 100 that manages the latest value. Then, the process ends.

Figure 7:
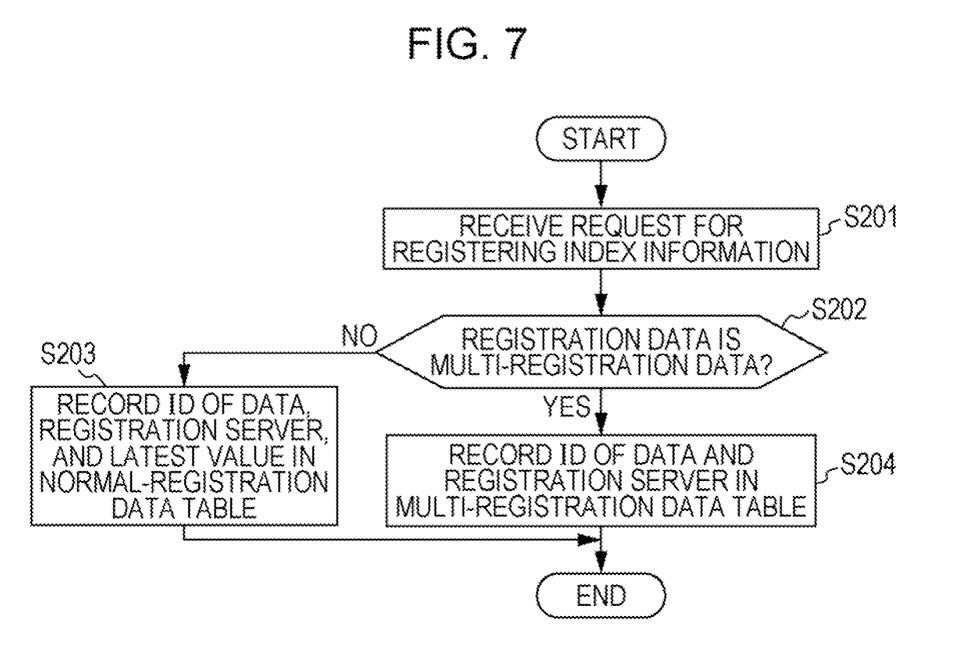
FIG. 7 is a flowchart illustrating a data registration process performed by an index server.

A data registration process performed by the index server 100 will be described with reference to FIG. 7. In step S201, the index management unit 110 receives a request for registering index information from the registration server 200. If the request is a normal-registration request, the information "ID: ID-2345", "latest value: 20.4° C.", and "registration server: 10.0.0.34: 9090" is transmitted from the registration server 200 to the index server 100. On the other hand, if the request is a multi-registration request, the information "ID: ID-2344" and "registration server: 10.0.0.34: 9090" is transmitted from the registration server 200 to the index server 100. Then, the process proceeds to step S202.

In step S202, the index management unit 110 determines whether registration data is multi-registration data with reference to the index information storage unit 112. If the registration data is multi-registration data, the process proceeds to step S204. On the other hand, if the registration data is not multi-registration data, the process proceeds to step S203.

In step S204, the index management unit 110 records the ID of the data and the registration server 200 in the multi-registration data table 112A. Then, the process ends.

In step S203, the index management unit 110 records the ID of the data, the registration server 200, and the latest value in the normal-registration data table 112B. Then, the process ends.

Figure 8:
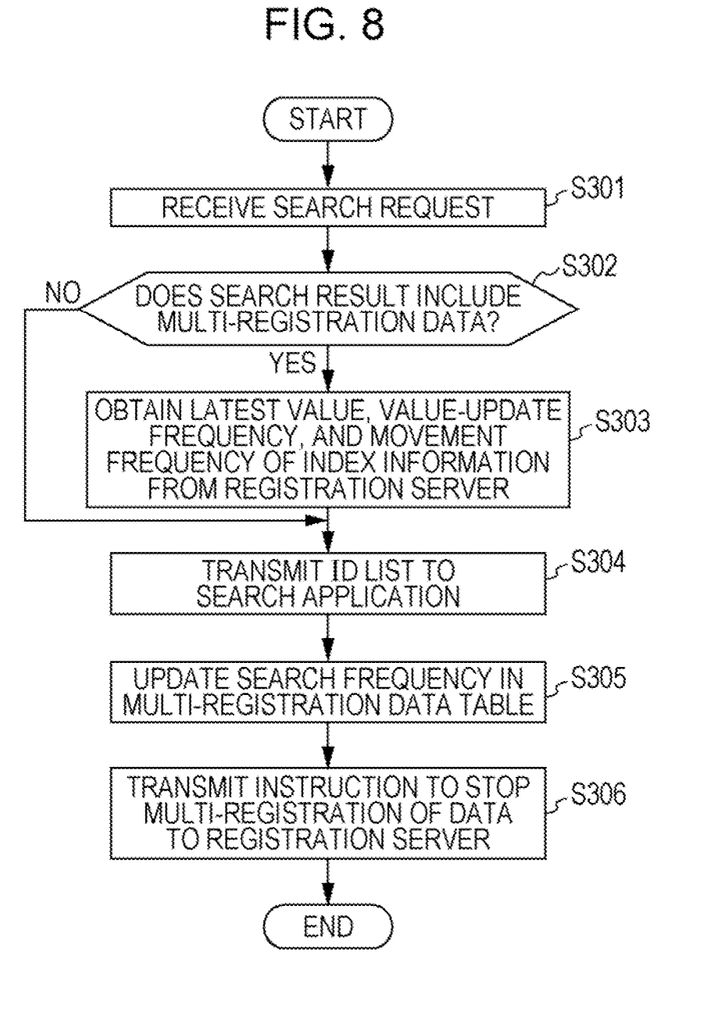
FIG. 8 is a flowchart illustrating a search process performed by an index server.

A search process performed by the index server 100 will be described with reference to FIG. 8. In step S301, the search unit 106 receives a search request from the search application 1A, 1B, or 1C. A user performs search by using "temperature=21.x° C." with the search application. Then, the process proceeds to step S302.

In step S302, the search unit 106 determines whether a search result includes multi-registration data with reference to the index information storage unit 112. If the search result includes multi-registration data, the process proceeds to step S303. On the other hand, if the search result includes no multi-registration data, the process proceeds to step S304.

In step S303, the latest value referring unit 108 obtains the latest value of the multi-registration data, the value-update frequency, and the movement frequency of index information from the registration server 200. The latest value referring unit 108 records the latest value of the multi-registration data on a memory, and the process proceeds to step S304.

In step S304, the search unit 106 creates an ID list corresponding to "temperature=21.x° C." on the basis of the latest value of the normal-registration data and the latest value of the multi-registration data obtained in step S303 and transmits the ID list to the search application. Then, the process proceeds to step S305.

In step S305, the index management unit 110 updates the search frequency 1123 in the multi-registration data table 112A. Then, the process proceeds to step S306.

In step S306, if the ratio between the update frequency that is obtained together with the latest value and the search frequency is equal to or higher than a predetermined value, the search frequency/value-update frequency comparing unit 104 transmits an instruction to stop multi-registration of the data having the ID to the registration server 200. Then, the process ends.

Now, the ratio between the update frequency and the search frequency will be described. Multi-registration is effective when "search frequency×load of obtaining latest value" in the index server 100 is smaller than "index server update frequency×(load of registering and deleting index information)" in the registration server 200. When multi-registration is to be performed, it is necessary for the index server 100 to obtain a latest value from the registration server 200. Thus, a load of obtaining the latest value is generated compared to the case of not performing multi-registration. Therefore, the ratio between a load of obtaining a latest value in the index server 100 and a load of registering/deleting index information in the registration server 200 is obtained in the entire database system 0, and multi-registration is stopped when the load of obtaining a latest value in the index server 100 becomes larger than the load of registering/deleting index information in the registration server 200.

Figure 9:
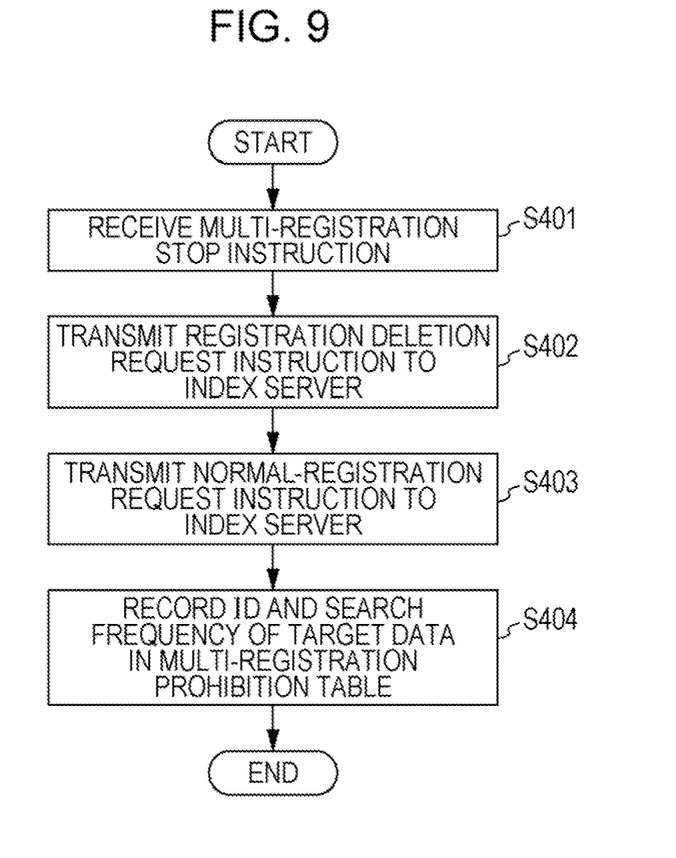
FIG. 9 is a flowchart illustrating a multi-registration stop process performed by a registration server.

A multi-registration stop process performed by the registration server 200 will be described with reference to FIG. 9. In step S401, the multi-registration prohibition instruction receiving unit 204 updates data management information with reference to a multi-registration stop instruction received from the index server 100. The multi-registration stop instruction includes "ID: ID-2344" and "search frequency: 40 times/hour". Then, the process proceeds to step S402.

In step S402, the multi-registration prohibition instruction receiving unit 204 transmits a registration deletion request instruction to the index server 100 in which the data is registered. The registration deletion request instruction includes "ID: ID-2344". Then, the process proceeds to step S403.

In step S403, the index normal-registration unit 206 transmits a normal-registration request instruction to the index server 100 corresponding to the latest value of the data. The normal-registration request instruction includes "ID: ID-2344", "latest value: 20.4° C.", and "registration server: 10.0.0.34: 9090". Then, the process proceeds to step S404.

In step S404, the multi-registration prohibition instruction receiving unit 204 records the ID and search frequency of the target data in the multi-registration prohibition table 212. With the recording of the ID of the target data in the multi-registration prohibition table 212, multi-registration is not performed on the data thereafter.

In this embodiment, a description has been given about the case of searching for a room having a temperature of 20° C. among rooms in a building by using temperature sensors set in the rooms. Alternatively, location information may be used instead of temperature. For example, the location information is based on radio frequency identification (RFID) or other technologies. When location information based on RFID is used, a database that stores location information of devices to which an RFID is attached may be managed. For example, assume that there are an index server that manages information about Kawasaki-city and an index server that manages information about Yokohama-city. In this case, information about devices that is frequently transmitted over the boundary of the cities needs to be repeatedly registered in/deleted from both the servers according to the related art. However, the above-described embodiment enables the registration and deletion to be reduced.

According to an aspect of the embodiment, when the change frequency of an index server that stores index information is equal to or higher than a predetermined value, the index server receives, from a registration server, attribute information corresponding to the index information of which change frequency is equal to or higher than the predetermined value. Therefore, the amount of communication performed for a process of updating index information between the index server and the registration server can be reduced.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-implemented method executed by a management server controlling a plurality of index servers for searching a database storing an object identifier and an attribute value associated with the object identifier, each of the plurality of index servers handling a part of the database, each of the index servers storing index information including the attribute value within a range predefined for the each of the plurality of index servers and the associated object identifier stored in the database, each of the index servers returning the object identifier in reference to the stored index information in response to a search request transmitted from a search apparatus, the method comprising:
    deleting one of index information stored in one of the index servers and storing the one of the index information into other index server in reference to the range of each of the index servers when the attribute value stored in the database being updated, and the updated attribute value coming to be out of the range of the one of the index servers and to be in the range of the other index server;
    obtaining a frequency of the deleting and the storing the one of the index information; and
    enabling the index server to obtain an attribute value from the database upon the index server receiving a search request corresponding to the one of the index information from the search apparatus when the obtained frequency being more than a predetermined value.

2. The method of claim 1, wherein the management server stops updating the index information stored in the index server when the obtained frequency corresponding to the index information being more than the predetermined value.

3. The method of claim 2, wherein each of the servers obtains a receiving frequency of the attribute value from the database.

4. The method of claim 3, wherein the management server restart updating the index information on the basis of the receiving frequency.

5. The method of claim 4, wherein the management server restart updating the index information on the basis of the receiving frequency and the obtained frequency.

6. A system comprising:
    a database to store an object identifier and an attribute value associated with the object identifier;
    a processor, the processor configurable to execute:
    a plurality of index servers to search the database, handle a part of the database, store index information including the attribute value within a range predefined for the each of the plurality of index servers and the associated object identifier stored in the database, and return the object identifier in reference to the stored index information in response to a search request transmitted from a search apparatus; and
    a management server to delete one of index information stored in one of the index servers and store the one of the index information into other index server in reference to the range of each of the index servers when the attribute value stored in the database being updated, and the updated attribute value coming to be out of the range of the one of the index servers and to be in the range of the other index server, obtain a frequency of deleting and storing the one of the index information, and enable the index server to obtain an attribute value from the database upon the index server receiving a search request corresponding to the one of the index information from the search apparatus when the obtained frequency being more than a predetermined value.

7. The system of claim 6, wherein the management server stops updating the index information stored in the index server when the obtained frequency corresponding to the index information being more than the predetermined value.

8. The system of claim 7, wherein each of the servers obtains a receiving frequency of the attribute value from the database.

9. The system of claim 8, wherein the management server restart updating the index information on the basis of the receiving frequency.

10. The system of claim 9, wherein the management server restart updating the index information on the basis of the receiving frequency and the obtained frequency.

11. A non-transitory computer-readable recording medium that stores a computer program for controlling a management server capable of controlling a plurality of index servers for searching a database storing an object identifier and an attribute value associated with the object identifier, each of the plurality of index servers handling a part of the database, each of the index servers storing index information including the attribute value within a range predefined for the each of the plurality of index servers and the associated object identifier stored in the database, each of the index servers returning the object identifier in reference to the stored index information in response to a search request transmitted from a search apparatus, by controlling the management server according to a process comprising:

deleting one of index information stored in one of the index servers and storing the one of the index information into other index server in reference to the range of each of the index servers when the attribute value stored in the database being updated, and the updated attribute value coming to be out of the range of the one of the index servers and to be in the range of the other index server;

obtaining a frequency of the deleting and the storing the one of the index information; and enabling the index server to obtain an attribute value from the database upon the index server receiving a search request corresponding to the one of the index information from the search apparatus when the obtained frequency being more than a predetermined value.

12. The computer-readable recording medium of claim 11, wherein the management server stops updating the index information stored in the index server when the obtained frequency corresponding to the index information being more than the predetermined value.

13. The computer-readable recording medium of claim 12, wherein each of the servers obtains a receiving frequency of the attribute value from the database.

14. The computer-readable recording medium of claim 13, wherein the management server restart updating the index information on the basis of the receiving frequency.

15. The computer-readable recording medium of claim 14, wherein the management server restart updating the index information on the basis of the receiving frequency and the obtained frequency.

* * * * *